Sept. 1, 1931.  H. F. PITCAIRN  1,820,946
AIRCRAFT
Filed Nov. 8, 1927
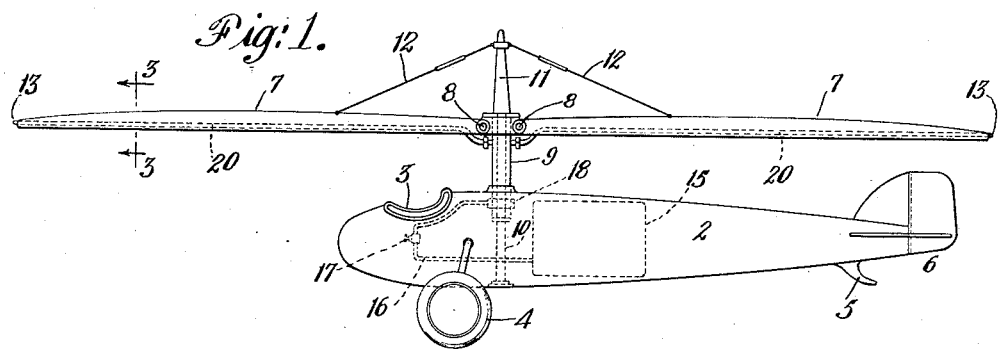
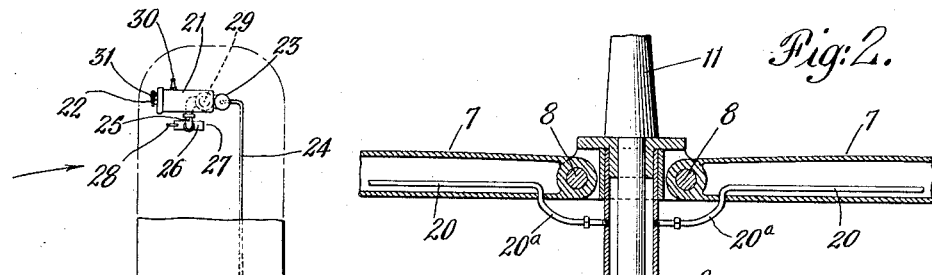
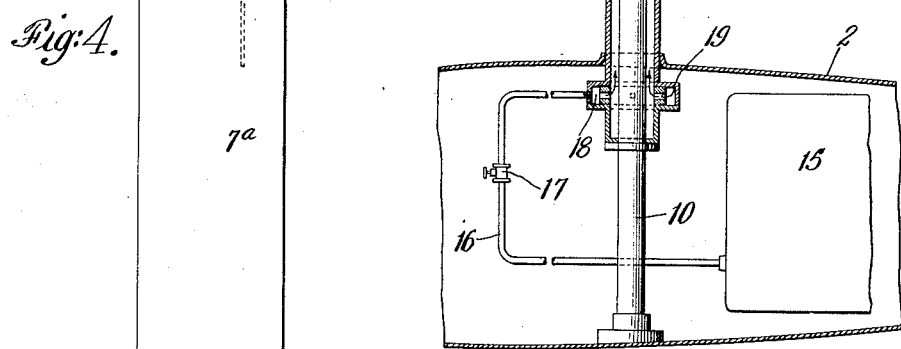
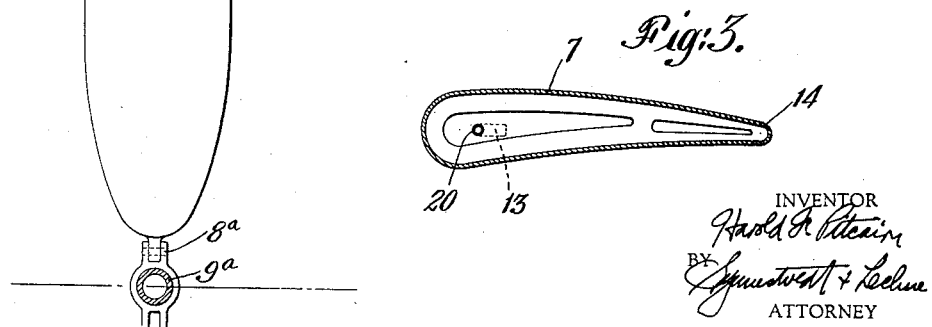
INVENTOR
Harold F. Pitcairn
BY
ATTORNEY Patented Sept. 1, 1931

1,820,946

UNITED STATES PATENT OFFICE

HAROLD F. PITCAIRN, OF BRYN ATHYN, PENNSYLVANIA, ASSIGNOR TO AUTOGIRO COMPANY OF AMERICA, OF PHILADELPHIA, PENNSYLVANIA, A CORPORATION OF DELAWARE

AIRCRAFT

Application filed November 8, 1927. Serial No. 231,858.

This invention relates to aircraft, and more particularly to propulsion means therefor, and is especially useful in connection with aircraft of the helicopter type.

In aircraft of the type referred to, certain serious difficulties and disadvantages have been encountered, among which may be mentioned the following:

In helicopters generally, where but one propelling and lifting unit has been employed, the power mechanism driving the propeller has created such a torque between it and the body of the machine as to make the craft inoperative.

In many cases a plurality of such rotating units have been employed, for example, a pair of them rotating in opposite directions, in order to counteract or neutralize such undesired torque. However, such arrangements practically destroy stability, and, furthermore, they render the whole construction more cumbersome and complicated, adding greatly to the structural problems encountered in the design of helicopters.

In helicopters of either general form, i. e., the single lifting unit type, or the multi-unit type, heavy driving shafts or tubes have usually been necessary, and suitable radial and thrust bearings therefor; and the aerofoils being of considerable overall length and driven from a central hub, have been necessarily of rather heavy construction to stand the driving strains.

I aim by my invention to overcome the foregoing difficulties and disadvantages and others commonly incident to helicopter construction and operation, and, in general, to provide means for actuating the lifting and propelling mechanism of such aircraft, which shall obviate the difficulty of relative torque between said mechanism and the fuselage, improve stability, reduce the structural difficulties encountered in connection with wings and other parts, and eliminate certain parts heretofore usually employed.

More specifically, I provide means associated with the lifting unit itself for driving or rotating the same, such means including jet apparatus with means for causing a fluid under pressure to be expelled therethrough against the atmosphere, and I preferably employ, to be driven by such jets, a single multi-bladed rotating unit, each blade or wing of which is pivoted for up and down swinging movement about an axis adjacent the center of rotation of the unit.

How I obviate the difficulties recited and attain the desired advantages, together with such others as are incident to my invention or may occur to those skilled in the art, will appear from the following description, taken together with the accompanying drawings, in which—

Fig. 1 is an elevation illustrating a helicopter construction embodying one form of the invention.

Fig. 2 is an enlarged sectional view of a portion of the apparatus shown in Fig. 1.

Fig. 3 is a section on the line 3—3 of Fig. 1, and

Fig. 4 is a plan view of a helicopter wing showing another form of apparatus for carrying out the invention, part of the upper surface of the wing being broken away to show such apparatus.

Referring first to Figs. 1 to 3, it will be seen that I have illustrated a helicopter having body or fuselage 2, cockpit 3, landing wheels and skids 4 and 5, and control surfaces indicated generally at 6. Mounted above the fuselage is a single propelling and sustaining unit comprising two wings or aerofoils 7, 7, pivoted at their inner ends, as by hinged connections 8, on a tube 9 which is freely rotatable about the fixed upright 10. Tube 9 is provided with an extension 11 from which the blades 7 may be supported, by means of guys 12, as against drooping when the wings are at rest.

Each wing or blade 7, of the lifting and propelling unit, is provided with a jet nozzle or nozzles 13, preferably located at or near the tip and directed toward the trailing edge 14 of the wing (as shown in Fig. 3). Fluid under pressure is supplied to said jets, and in Figs. 1 and 2 I have shown a tank 15 adapted to contain a fluid, such as air, under pressure (with which may be associated any suitable compressor, not shown), from which a pipe or conduit 16 conveys the fluid, through valve 17 to an annular chamber 18, from whence it passes through ports 19 into the interior of tube 9, and from thence through tubes 20 to said jets through which it is ejected.

The connecting portion 20a of each pipe 20 may be of flexible material to permit free pivotal movement of the blade, or else a flexible joint may be interposed in said pipe or the pipe may communicate with the interior of the tube 9 through the pivot 8 by the provision of a hollow pin for said pivot with communicating ports.

In the alternative construction, shown in Fig. 4, the wing 7a, which is pivoted at 8a to shaft 9a, is equipped with an explosion chamber 21 having a jet opening 22 (which takes the place of the nozzles 13 of Figs. 1 to 3). Associated with the chamber 21 is a carburetor 23 receiving fuel through the conduit 24 from any suitable fuel tank (not shown), and receiving air through a pipe 25 having a swivelled section 26 which is open at its end 27. The open end or inlet 27 is made to face always into the wind set up upon rotation of the aerofoil 7a, a vane or blade 28 being provided on the swivelled section 26 for that purpose.

The gaseous mixture of fuel and air from the carburetor is permitted to enter chamber 21 through an ordinary flutter valve 29 located at one end of the chamber. A spark plug 30 is provided at the opposite, or jet, end of the chamber to ignite the charge. Upon ignition thereof at the spark plug, the pressure created in the chamber closes the flutter valve 29 and the exploded mixture is expelled through the jet opening 22. Over the opening 22 I may provide a flap-valve 31 to prevent any inrush of air which might occur during moments of relative vacuum set up in the chamber between explosions. It will be understood that the fuel may be delivered under pressure, through pipe 24, or I may utilize the centrifugal force set up by the rotation of the wing to force said fuel out through said pipe.

From the foregoing it will be obvious that all torque usually encountered in helicopters between the body of the machine and the driven aerofoil is eliminated by my invention; and that the use of a single lifting unit having pivotal blades, with its attendant advantages of stability, ease of control, compensation for differences in lift by automatic changes in dihedral angle, and simplicity and lightness of construction, is made really practicable, for the first time, by my jet propulsion device.

What I claim is:—

1. An aircraft, a rotating propulsion unit thereon having aerofoils pivotally mounted, an impelling nozzle carried by each aerofoil, and mechanism for delivering a fluid under pressure to said nozzles including a fluid-conveying means intercommunicating between the aircraft and the aerofoils constructed to permit free pivotal movement of the aerofoils and rotative movement of the unit.

2. An aircraft, a rotating propulsion unit thereon having aerofoils pivotally mounted with respect to the aircraft and each other, an impelling nozzle carried by each aerofoil, and mechanism for delivering a fluid under pressure to said nozzles including a fluid-conveying means intercommunicating between the aircraft and the aerofoils constructed to permit free pivotal movement of the aerofoils and rotative movement of the unit.

3. An aircraft, a rotating sustaining unit thereon having aerofoils pivotally mounted, an impelling nozzle carried by each aerofoil, and mechanism for delivering a fluid under pressure to said nozzles including a fluid-conveying means intercommunicating between the aircraft and the aerofoils constructed to permit free pivotal movement of the aerofoils and rotative movement of the unit.

In testimony whereof, I have hereunto signed my name.

HAROLD F. PITCAIRN.